United States Patent [19]

Macomber et al.

[11] Patent Number: 5,061,933

[45] Date of Patent: Oct. 29, 1991

[54] SHORT-RANGE RADAR SYSTEM

[75] Inventors: Bennie E. Macomber; Daniel A. Goss, both of Ridgecrest, Calif.

[73] Assignee: The United States of America as represented by the Secretary of the Navy, Washington, D.C.

[21] Appl. No.: 677,193

[22] Filed: Apr. 13, 1976

[51] Int. Cl.[5] .............................................. G01S 13/32
[52] U.S. Cl. ..................................... 342/128; 342/201
[58] Field of Search ........................ 343/14, 17.2 PC; 342/128, 201

[56] References Cited

U.S. PATENT DOCUMENTS 3,281,842 10/1966 Cerar et al. ......................... 342/201
3,283,321 11/1966 Ward ............................... 342/128 X
4,161,732 7/1979 Longuemare, Jr. ................. 342/201

Primary Examiner—T. H. Tubbesing
Attorney, Agent, or Firm—Melvin J. Sliwka; Sol Sheinbein

[57] ABSTRACT

A short-range radar system having a unquie method of processing a linear FM/CW signal so as to provide target range information at the time of target detection. The linear FW/CW signal is mixed with a portion of the transmitted signal and with an intermediate frequency ramp signal to produce a difference frequency signal in the form of a frequency ramp which is a function of the range to the target. The ramp signal is then converted to a pulse which is determinative of the range to the target.

5 Claims, 3 Drawing Sheets

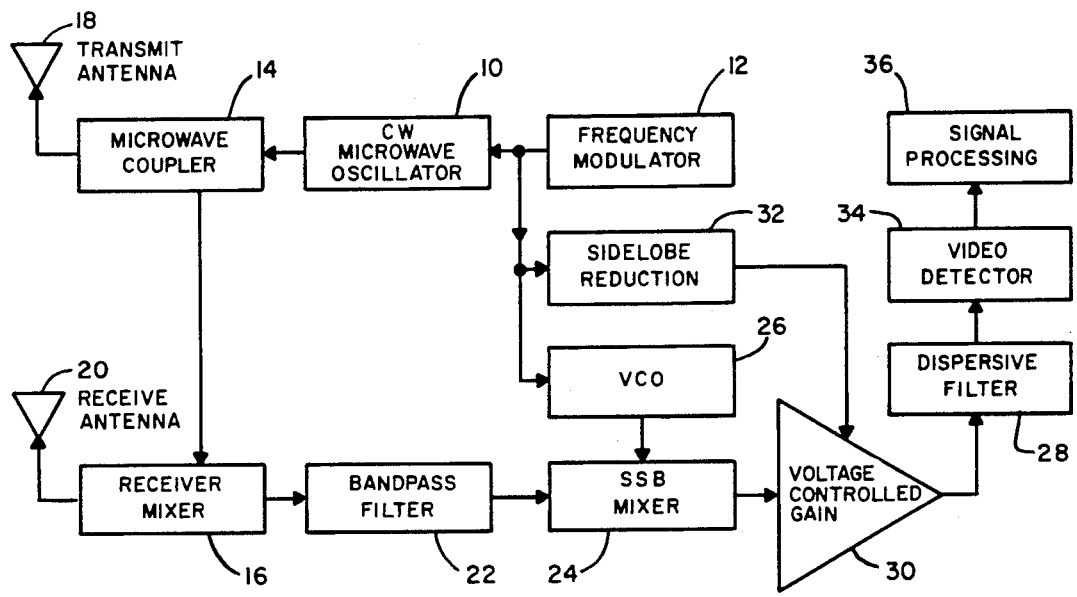
Fig. 1
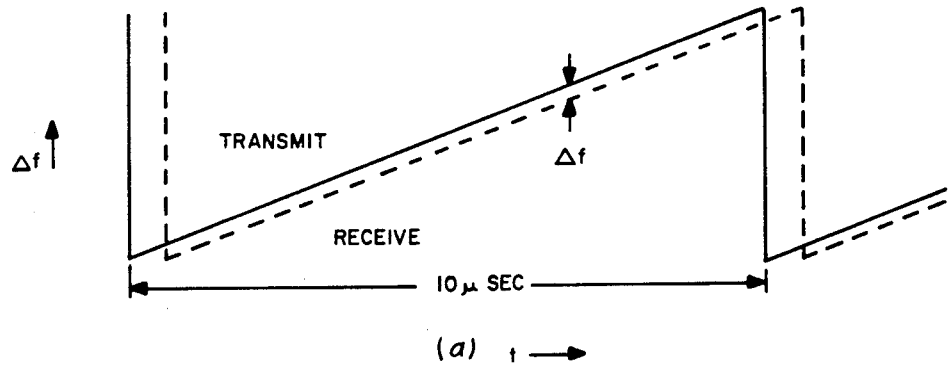
(a)
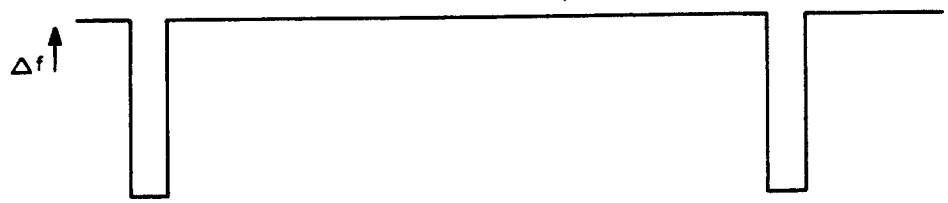

SHORT-RANGE RADAR SYSTEM

BACKGROUND OF THE INVENTION

The present invention relates to a short-range radar system, and more particularly to such a system which converts a linear FM/CW signal to a pulse which is positioned in time as a function of range to a target.

Various types of short-range radars are presently used, and can be placed into two basic categories. These categories and their limitations are:

(1) Non-coherent short pulse radars which require high peak transmit power and wide bandwidth receivers and signal processing circuits; and (2) Coherent doppler processing radars which require complex circuitry to implement multiple range gates, have limited target range accuracy, and require processing circuitry operating at doppler frequencies.

SUMMARY OF THE INVENTION

The present invention transmits a CW microwave signal which is frequency modulated by a sawtooth function. A portion of the transmitted signal is combined with the signal reflected from a target to produce a difference frequency. A voltage controlled oscillator (VCO) which is synchronized to the sawtooth frequency modulating signal provides a ramp frequency output as a reference signal to a single sideband (SSB) mixer. The single sideband mixer provides a difference frequency in the form of a ramp frequency signal which is amplified by an amplifier, the gain of which is voltage controlled by a time weighting voltage signal in synchronization with the sawtooth of the frequency modulator, the amplitude of the control voltage being a cosine function, to reduce the sidelobes of the difference frequency. The difference frequency is then converted to a pulse by a dispersive filter whose frequency versus time characteristics are matched to the frequency versus time characteristics of the voltage controlled oscillator. The pulse is then detected and processed by time domain signal processing and range controlling circuitry to give the range output.

BRIEF DESCRIPTION OF THE DRAWING

FIG. 1 is a block diagram of the short-range radar system;

FIG. 2 is a representation of (a) the transmit and receive signals for FIG. 1, and (b) the difference frequency for FIG. 1;

DESCRIPTION OF THE PREFERRED EMBODIMENTS

Figure 3:
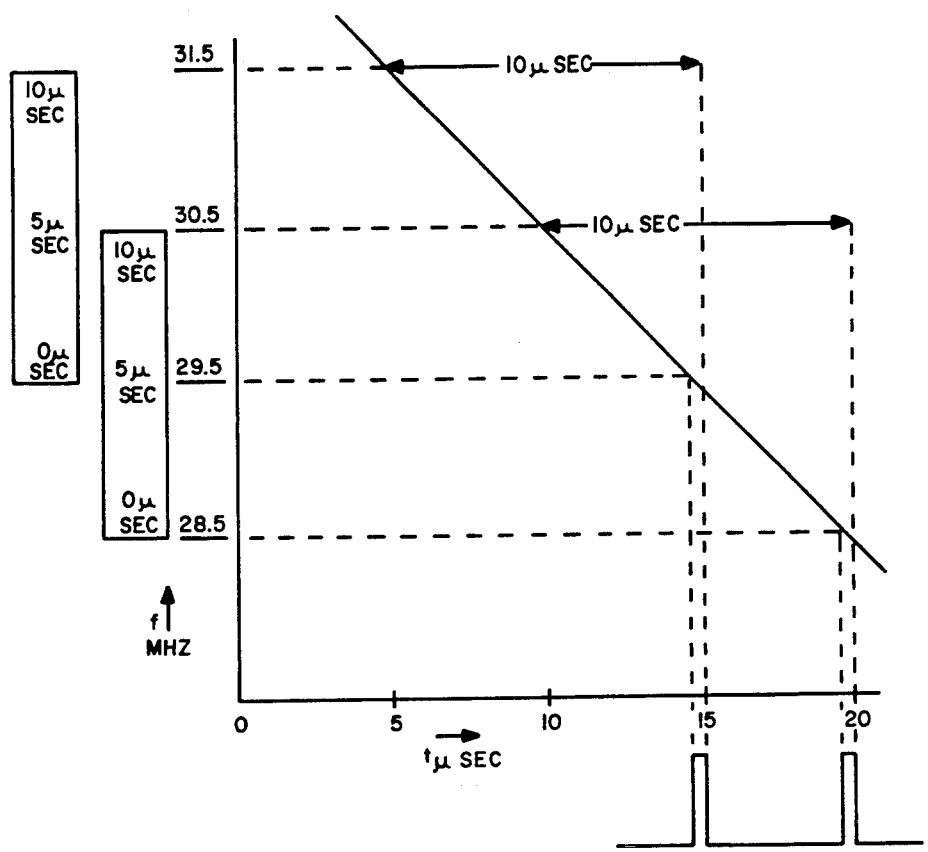
FIG. 3 is plot of the frequency versus time characteristic of the dispersive filter of FIG. 1, illustrating the conversion of a continuous ramp frequency signal to a pulse.

Referring now to FIG. 1, a CW microwave oscillator 10 is linearly frequency modulated by a sawtooth voltage function from frequency modulator 12 in a recurring manner. The frequency modulated output of the microwave oscillator 10 is routed through a microwave coupler 14 to provide a reference signal for the receiver mixer 16, and then to the transmitter antenna 18. Reflected signals from a target are collected by the receiver antenna 20 and coupled to the receiver mixer 16. The resultant difference frequency from the receiver mixer 16 is a function of range to the target. It is equal to the frequency change of the microwave oscillator 10 in the time interval during which the transmitted signal is traveling to the target and the reflected signal is returning to the receiver, as illustrated in FIG. 2a. The difference signal is further described by the fact that it is discontinuous from one sawtooth to the next as illustrated in FIG. 2(b).

The discontinuous difference frequency from the receiver mixer 16 is coupled to a bandpass filter 22 whose pass band corresponds to the frequencies of target ranges of interest. Also, the attenuation versus frequency characteristics of the filter can be designed to produce any desired sensitivity versus target range response. The output of the band pass filter 22 is coupled to a single sideband mixer 24. The reference frequency for the single sideband mixer 24 is provided by a voltage controlled oscillator 26, which frequency is controlled by the sawtooth voltage function from frequency modulator 12. In addition, the frequency versus time characteristic of the voltage controlled oscillator 26 is made to match the characteristic of the dispersive filter 28.

The single sideband mixer 24 is so designed as to allow only the difference frequency (the voltage controlled oscillator 26 frequency minus the bandpass filter 22 frequency) to pass. The resultant signal is one whose rate of change in frequency matches the dispersive filter 28 characteristic. Also, the range of frequencies at the output of the single sideband mixer 24 correspond to the range of the target.

A voltage controlled gain amplifier 30 follows the single sideband mixer 24. A time weighting circuit 32, synchronized to the sawtooth voltage function 12, develops a voltage to control the gain of the amplifier 30, the amplitude of the voltage developed by the time weighting circuit 32 being a sidelobe reducing function. The resultant output of the amplifier 30 is a time weighted signal which has reduced sidelobes when processed by the dispersive filter 28.

The characteristic of the dispersive filter 28 is such that an input signal of suitable rate of change of frequency and of the prescribed duration will be compressed in time to form a narrow pulse at its output as illustrated in FIG. 3. Additionally, the time of occurrence of the output with respect to the input signal is a function of the range of frequencies of the input. Thus, the output of the dispersive filter 28 is a series of narrow pulses whose position in time relative to the sawtooth voltage function 12 is a function of range of the target. These pulses of energy contain the frequencies of the output of the single sideband mixer 24 and can be detected by a detector 34 to provide video pulses which contain target range and amplitude information. The signal processing circuits 36 provide additional processing of these video pulses.

FIG. 3 shows a typical frequency versus time characteristic for the dispersive filter 28 where the center frequency of the single sideband mixer 24 is 30 MHz. Two target returns are shown to the left of the frequency versus time characteristic. Referring to the target with a frequency range of 29.5 to 31.5 MHz, at time t=0 the signal is delayed by the dispersive filter 28 by a time of 14.5 microseconds. At the end of the target pulse, 10 microseconds later, the delay is only five microseconds which, together with the 10 microseconds required to reach that point in the pulse, results in the end of the pulse occurring at 15 microseconds. The resultant output pulse is one-half microsecond in width occurring in time 14.5 microseconds after the start of the sawtooth voltage function 12. Following the same process for the second signal with frequencies between 28.5 and 30.5 MHz results in a pulse occurring at 19.5 microseconds after the start of the sawtooth voltage function 12. Thus, a coherent CW signal is converted to a short pulse.

Figure 4:
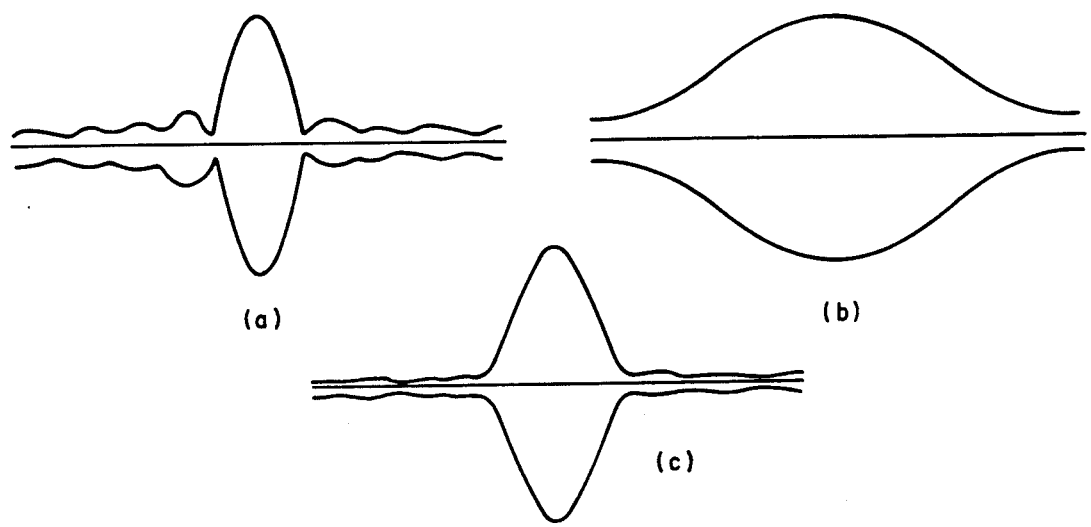
FIG. 4 illustrates (a) the pulse with sidelobes, (b) the time weighted difference frequency signal, and (c) the pulse with the sidelobes suppressed.

FIG. 4 illustrates the sidelobe reduction characteristics of this short-range radar system. The output of the dispersive filter 28 without any sidelobe reducing function is shown in FIG. 4a with its attendant sidelobes. The time weighted voltage shown in FIG. 4b is obtained at the output of the voltage controlled gain amplifier 30, with the resultant reduction of the sidelobes at the output of the dispersive filter 28 as illustrated in FIG. 4c.

Figure 5:
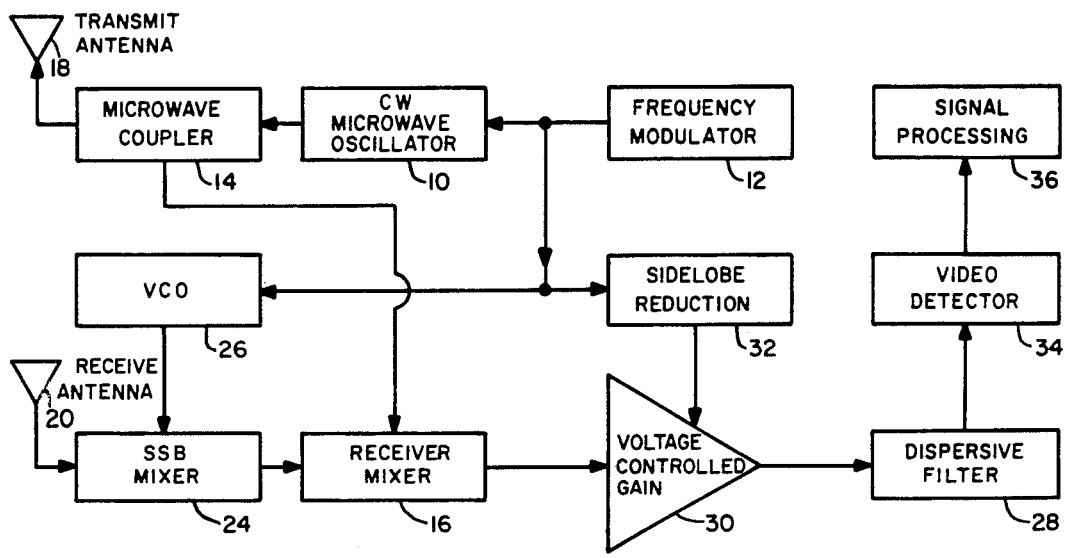
FIG. 5 is a block diagram of another embodiment of the short-range radar system.

The change due to the frequency discontinuities illustrated in FIG. 2b may appear as targets, masking real targets, especially when the sensitivity of the short-range radar system is increased. Blanking may be used during the period of the frequency discontinuities to avoid this problem, or the single sideband mixer 24 may be situated between the receiver antenna 20 and the receiver 16 as illustrated in FIG. 5. In this embodiment, the bandpass filter 22 of FIG. 1 cannot be used since the output of the receiver mixer 16 is a frequency ramp. The removal of the bandpass filter 22 results in the loss of the attenuation versus frequency characteristics of the filter to produce the sensitivity versus target range response. However, this characteristic can be supplied by standard pulse radar technology after the dispersive filter 28.

Figure 6:
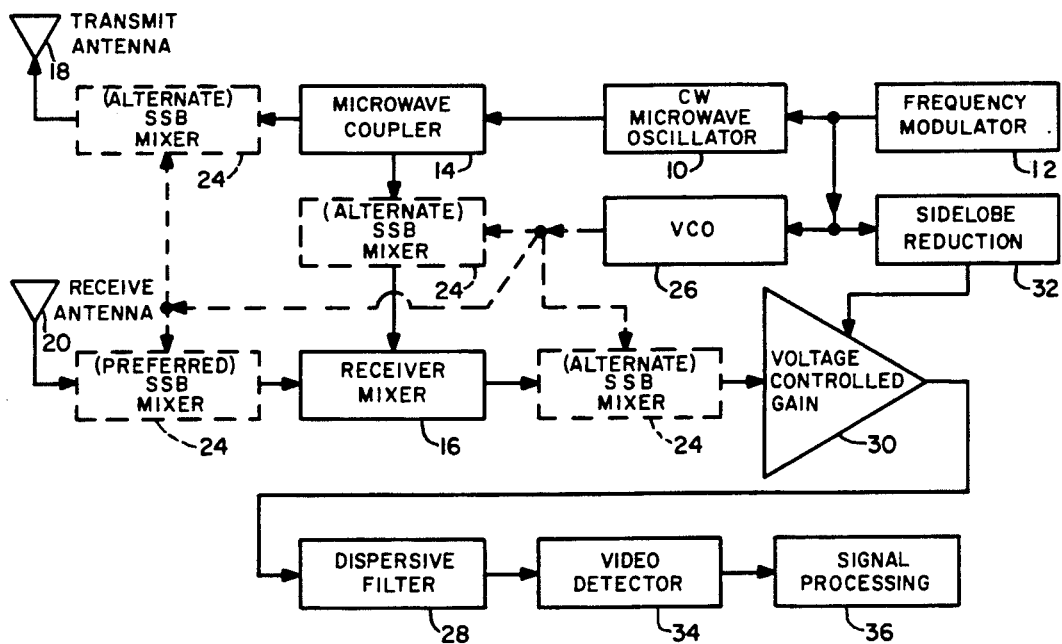
FIG. 6 is a block diagram of other embodiments of the short-range radar system.

Referring now to FIG. 6, alternate positions of the single sideband mixer 24 are illustrated. The location of the single sideband mixer 24 between the transmit antenna 18 and the microwave coupler 14 is the least desirable location, inasmuch as one-half of the power of the transmitted signal is lost by the action of the mixer. It is apparent, however, that the single sideband mixer 24 can be situated almost anywhere in the transmit or receive path of the short-range radar system to achieve the desired result, the preferred location being between the receiver antenna 20 and the receiver mixer 16.

The present invention combines the good range resolution advantage of a non-coherent short pulse radar with the low peak transmit power advantage of a coherent CW radar. The large transmit band which is necessary for good range resolution is obtained by modulation characteristics which spread the spectrum of a CW signal. The target-return spread spectrum CW signal is then processed coherently so that non-coherent interfering signals are rejected. Since the target range information is contained in a narrow band of difference frequencies, a wide bandwidth receiver is not required for good range resolution. By using this unique signal processing system, the range information is converted to an expanded time domain to facilitate signal processing and allow easy implementation of techniques which provide continuous range information. This system has the advantage of obtaining good range resolution with a narrow band receiver without being restricted to processing targets at doppler frequencies.

What is claimed is:

1. A short-range radar system comprising;
   means for producing and transmitting a microwave signal;
   means for frequency modulating said microwave signal with a ramp signal;
   means for receiving the portion of said microwave signal reflected from a target;
   means for combining said received microwave signal with a portion of said transmitted microwave signal to produce a difference frequency which is a function of the range to said target;
   means for introducing an intermediate frequency signal so that said difference frequency is a ramp function, the frequency range of said ramp function being a function of the range to said target; and
   means for converting said difference frequency to a pulse, the location of said pulse in time being determinative of the range to said target.

2. A short-range radar system as recited in claim 1 further comprising means for reducing sidelobes which occur around said pulse to reduce the range ambiguity of said short-range radar system.

3. A short-range radar system as recited in claim 2 wherein said introducing means comprises a voltage controlled oscillator with a frequency ramp output synchronized with said frequency modulating means, and a single sideband mixer to which said frequency ramp output and said difference frequency are applied to produce said difference frequency ramp function.

4. A short-range radar system as recited in claim 3 wherein said converting means comprises a dispersive filter, the frequency versus time characteristic of said dispersive filter being matched by the frequency versus time characteristic of said voltage controlled oscillator.

5. A short-range radar system as recited in claim 4 wherein said sidelobe reducing means comprises a voltage controlled amplifier to amplify said difference frequency, and a time weighting voltage circuit synchronized with said frequency modulating means to control the gain of said amplifier, the amplitude of said weighting voltage being an appropriate sidelobe reducing function.

* * * * *